Nov. 1, 1938.　　　M. O. SNEDIKER　　　2,135,294
SUMMER AND WINTER TEMPERATURE CONTROL
Filed Jan. 21, 1937　　　2 Sheets-Sheet 2
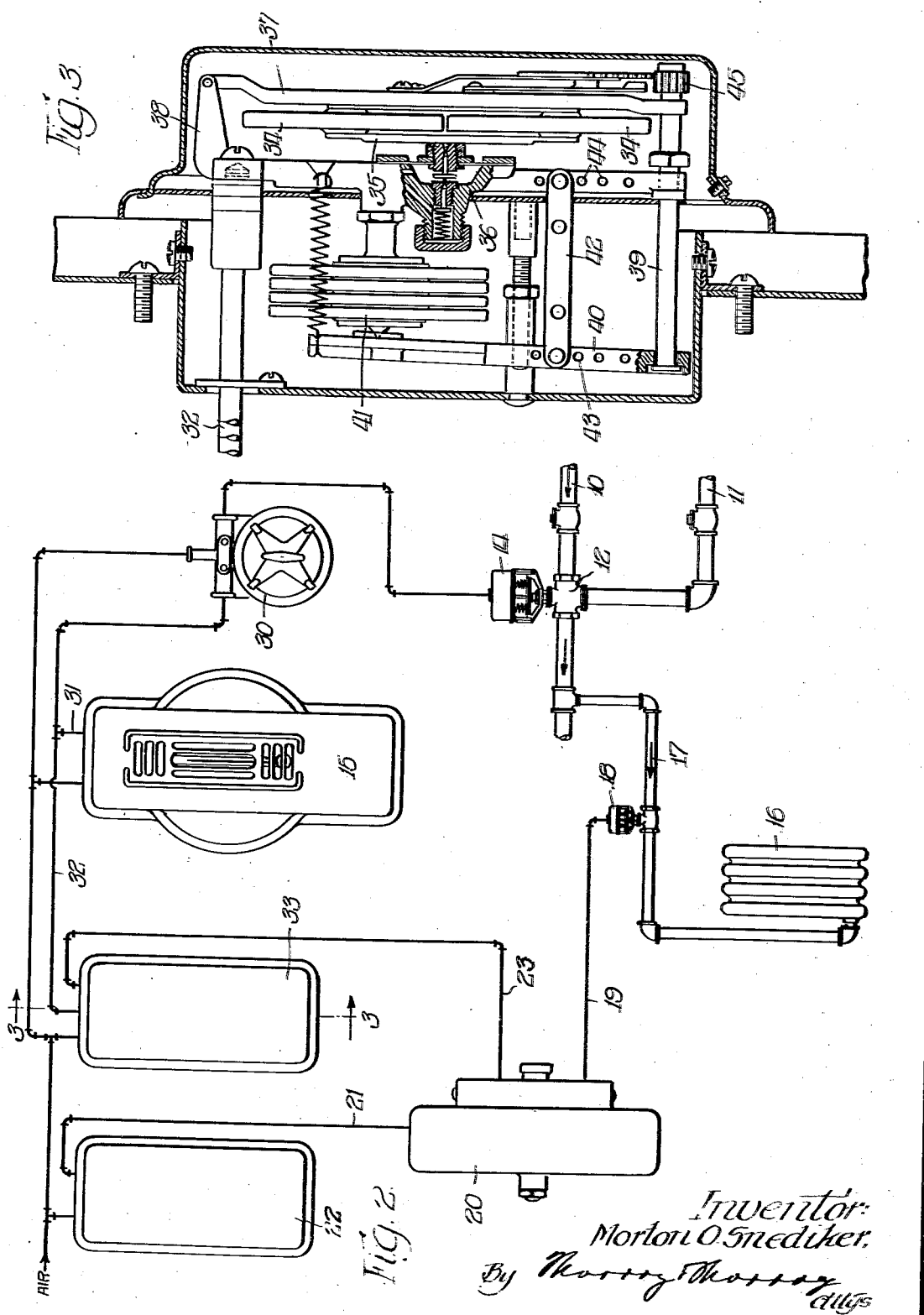
Inventor:
Morton O. Snediker
By Morrow & Morrow
Attys Patented Nov. 1, 1938

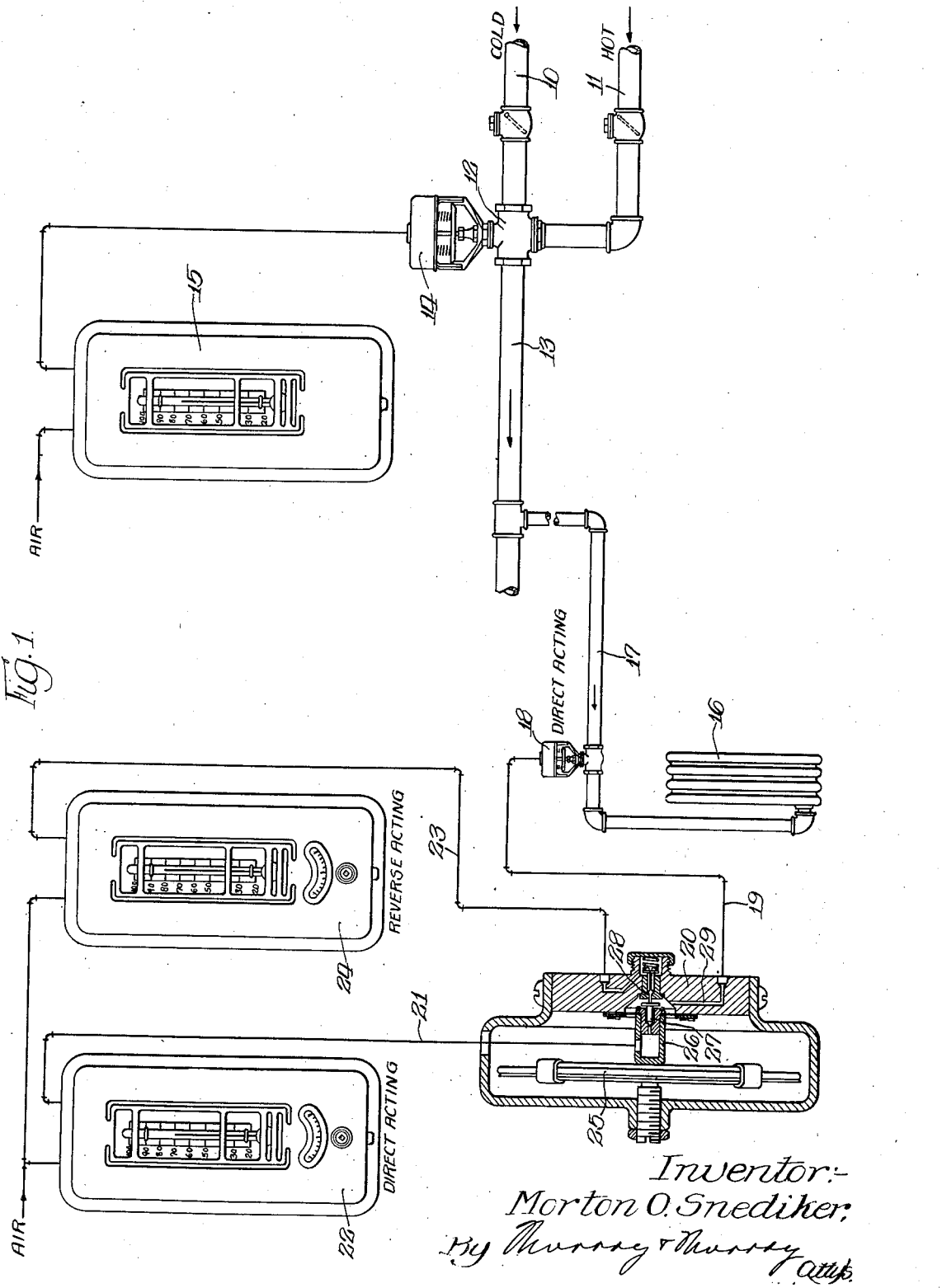

2,135,294

UNITED STATES PATENT OFFICE 2,135,294

SUMMER AND WINTER TEMPERATURE CONTROL

Morton O. Snediker, Chicago, Ill., assignor to The Powers Regulator Company, Chicago, Ill., a corporation of Illinois Application January 21, 1937, Serial No. 121,434

4 Claims. (Cl. 236—1)

My invention relates to thermostatic and collateral devices adapted to effect automatic control of heating and cooling.

An object of my invention is to provide apparatus that will directly and automatically control the heating and cooling of a room or rooms within predetermined limits. In order to accomplish the desired result, I provide supplies of heating and cooling mediums and control the admission of the respective fluids to a supply main by means of a thermostat, located preferably at a key point within or without the building, the thermostat being set to operate at a median point between the heating and cooling limits, the thermostat acting, when said median point has been reached, to change the character of the heat exchange fluid that may be supplied.

In the room or space, the temperature of which is to be controlled, I provide two thermostats of common construction, one direct acting and the other reverse acting, the exhaust passages from both said thermostats being connected to a thermostatic switch, so arranged that at a median point between the cold and warm temperature limits, it will disconnect one thermostat and connect the other thermostat with a valve for admitting hot and cold fluids to a heat exchange device.

In another form of the invention additional provision is made for utilizing the so-called key thermostat as a master for changing the adjustment of the summer thermostat in order to avoid too great a spread between outdoor and indoor temperatures. For example, while it may be desirable to maintain an inside temperature of 75 when the outdoor temperature is 80 or 85°, it is undesirable and possibly harmful to maintain the same inside temperature with an outdoor temperature of 90° or upward; in other words, there should be provision for automatically adjusting the inside temperature in proportion to the outside temperature. The desired result is accomplished by the use of simple mechanism.

The invention will be more readily understood by reference to the accompanying drawings, in which, Fig. 1 is a diagrammatic layout showing the different instrumentalities necessary to carry out the invention herein described;

Fig. 2 is a view similar to Fig. 1 showing a somewhat modified arrangement in which provision is made for variation of the indoor temperature in accordance with outdoor temperatures; and, Fig. 3 is a sectional view through the warm weather thermostat shown in Fig. 2.

In the drawings I have shown inlet pipes 10, 11 for cold and hot fluids respectively. A three-way valve 12 controls the admission of said fluids to a supply main 13 for a building. The three-way valve is operated by an air motor 14, having a pipe connection to the exhaust from a thermostat 15 of conventional form, located preferably at a key point in or outside of a building. This thermostat may be located at some sheltered point where it is unaffected by wind or sun and is subject to the general outdoor temperature. This thermostat will be set at a point, say 75°, that will be midway between an upper temperature limit where the cooling medium is to be supplied and a lower temperature limit where the heating medium is to be discontinued. Thus, the shift from the heating to cooling condition is brought about automatically without direct control by outside temperature conditions and without depending on the volition of an engineer.

For the control of individual spaces in a building, I provide a heat exchange device, such as a radiator, indicated generally by the numeral 16, to which the heating or cooling medium is supplied through a pipe 17. A direct-acting, air motor-operated valve 18 is provided in this line, an air pipe 19 connecting the motor to the thermostatic switch 20. An air pipe 21 connects a direct-acting, low temperature thermostat 22 to the switch, and an air pipe 23 connects the reverse-acting thermostat 24 thereto. The switch includes a thermostatic element 25, acting by expansion to move a tube 26 to which the pipe 21 is connected, the tube carrying a valve 27. A second valve 28 moved by the valve 27 controls the admission of air through the pipe 23, the outlet passage 29 for the space between the two valves being in communication with the pipe 19 to the radiator control valve.

Assuming the key thermostat to be set at 75 degrees, the thermostatic switch to be set at 75 degrees, the reverse acting high temperature thermostat at 80 degrees and the direct-acting low temperature thermostat at 70 degrees, the operation is as follows:

With the valve 12 positioned to admit hot fluid to the system, due to a temperature condition at the key thermostat of less than 75 degrees and assuming a temperature of 69 in the space that is to be controlled, the thermostatic switch 20 will, due to its setting, provide an open passage from the pipe 21 through the tube 26, past the valve 27, through the passage 29 and the pipe 19 to the space above the direct acting valve motor 18. The operation of the direct acting thermostat will be such that at a temperature below 70 air will escape and no pressure will be present in the pipe 21 and the different passages to the radiator valve 18. As a consequence, the said valve will be open and heat will be delivered to the radiator 16. As the temperature approaches 70, the thermostat 22 will act to build up pressure in the pipe 21 and finally to close the radiator valve. As the temperature continues to rise to a point above 75, the thermostatic switch will operate, due to the expansion of the thermostatic element 25. Thus the valve 27 will be closed and the valve 28 opened, thus placing the pipe 23 in communication with the pipe 19, through the switch. Inasmuch as the thermostat 24 is reverse acting, there will be pressure in the pipe 23 at that time, which will serve to maintain the radiator valve closed. However, after the temperature has passed 75, the key thermostat 15 will have reversed the valve 12 and provided for a supply of cold fluid, and as the temperature in the space reaches 80, the air pressure in the pipe 23 will be exhausted, thus reducing the pressure tending to keep the radiator valve closed and will permit it to open and to cool the space by the admission of the cooling fluid.

While I have shown the thermostats 22—24 and the switch 25 as separate instruments, it will be understood that they will, in practice, be all under one cover. It is apparent also that the occupant of the room may adjust the heating and cooling conditions within a substantial range, all without interfering with the automatic operation of the mechanism; that is to say, he may, if desired, adjust the low temperature thermostat for an upper limit of 75 and the high temperature instrument for a low temperature of 75, thus beginning the cooling effect where the heating effect leaves off. This undoubtedly would not take place in practice, as with outdoor temperature that would bring about an indoor temperature of 80, it is usually considered desirable to maintain the indoor temperature not materially below 80. The apparatus does, however, provide for flexibility and a substantial range of selection of temperatures.

In the construction of Figs. 2 and 3 all the elements remain the same as in Fig. 1 except in the construction of the summer thermostat, a sectional view through which is shown in Fig. 3 and, in addition, of a relay 30 for actuating the three-way valve 12.

With the thermostat 15 so set that it begins to pass air to the pipe 31 after the temperature at a key point reaches 75, the air so passed will be delivered to the relay 30 of conventional construction with the result that the valve motor 14 will be actuated and the valve 12 shifted to deliver cold instead of hot fluid to the supply main 13. The arrangement is such that with a small amount of pressure in the pipe 31 this action will take place, two pounds of pressure being ordinarily necessary. However, as the temperature at the key point rises, greater pressure is supplied to the pipe 31 and branch pipe 32 that leads to the warm weather thermostat 33.

This thermostat, as best shown in Fig. 3, includes twin thermo-sensitive elements 34, acting through a rigid support 35 to operate a leak valve 36 in the usual manner. The twin elements are backed by an arm 37 pivoted at its upper end on a bracket 38 and at its lower end connected through a rod 39 to link mechanism 40 operated by a bellows 41 that has an air connection to the pipe 32. Thus as pressure is built up in the line 32, due to an increase in temperature at the key point, the bellows 41 will be expanded, thus moving the backing 37 from the thermosensitive elements 34 and requiring greater expansion thereof in order to operate the valve 36. It will be noted that in the link mechanism connecting the bellows 41 with the thermo-sensitive element I provide for adjustment of the fulcrum bar 42 by utilizing different openings 43—44 in the connections. I am thereby able to change the ratio of readjustment by the master or key thermostat 15. The ordinary adjustments of the thermostat are effected in the usual manner through the parts 44.

By the use of the described apparatus I am able to automatically control the inside summer temperature in proportion to outdoor temperatures.

This distinguishes from the arrangement shown in Fig. 1 in which the summer indoor temperature would remain fixed regardless of outside temperatures subject only to manual adjustment. In the construction shown in Fig. 2 the adjustment to outside temperature would be automatic in a ratio to be determined by the setting of the thermostat 33.

It will be understood that while I have referred to certain of the instruments as direct or reverse acting, they may be reversed; that is, the radiator valve 18 may be reverse acting, the low temperature thermostat may be reverse acting and the high temperature thermostat may be direct acting, in which case the operation will be the same as that described.

I claim:

1. In combination, supply pipes for cold and hot fluids, a conduit to a heat exchanger, valve means for selectively connecting said pipes to said heat exchanger conduit, a thermostat set to operate said valve means at a temperature between the temperatures at which heating and cooling is to be carried on, a valve for said heat exchanger, a heating control thermostat, a cooling control thermostat, said last named thermostats being oppositely acting, and a thermostatic switch, operable at a temperature between the temperatures at which heating and cooling is to be carried on, for alternately connecting said thermostats to the valve for the heat exchanger.

2. In combination, supply pipes for cold and hot fluids, a conduit to a heat exchanger, valve means for selectively connecting said pipes to said heat exchanger conduit, a thermostat set to operate said valve means at a temperature between the temperatures at which heating and cooling is to be carried on, a valve for said heat exchanger, a direct-acting heating control thermostat, a reverse acting cooling control thermostat, and a thermostatic switch, operable at a temperature between the temperatures at which heating and cooling is to be carried on, for alternately connecting said thermostats to the valve for the heat exchanger.

3. In combination, supply pipes for cold and hot fluids, a conduit to a heat exchanger, valve means for selectively connecting said pipes to said heat exchanger conduit, a thermostat located at a key point and set to operate said valve means at a temperature between the temperatures at which heating and cooling is to be carried on, a valve for said heat exchanger, a direct-acting heating control thermostat, a reverse-acting cooling control thermostat, and a thermostatic switch, operable at a temperature between the temperatures at which heating and cooling is to be carried on, for alternately connecting said thermostats to the valve for the heat exchanger.

4. In combination, supply pipes for cold and hot fluids, a conduit to a heat exchanger, valve means for selectively connecting said pipes to said heat exchanger conduit, a thermostat set to operate said valve means at a temperature between the temperatures at which heating and cooling is to be carried on, a valve for said heat exchanger, a heating control thermostat, a cooling control thermostat, said last named thermostats being oppositely acting, a thermostatic switch, operable at a temperature between the temperatures at which heating and cooling is to be carried on, for alternately connecting said thermostats to the valve for the heat exchanger, and means operated by said first-named thermostat for varying the adjustment of said cooling control thermostat.

MORTON O. SNEDIKER.